United States Patent
Gibbons

[15] 3,661,408
[45] May 9, 1972

[54] POWER-ACTUATED PIPE COUPLER

[72] Inventor: Harold M. Gibbons, Long Beach, Calif.
[73] Assignee: FMC Corporation, San Jose, Calif.
[22] Filed: Apr. 13, 1970
[21] Appl. No.: 27,913

[52] U.S. Cl. .......................... 285/18, 285/364, 285/DIG. 21
[51] Int. Cl. ............................................................ F16l 35/00
[58] Field of Search ........... 285/18, 24, 27, DIG. 13, DIG. 21, 285/420, 364, 406; 24/243 R, 248 R

[56] References Cited

UNITED STATES PATENTS

| | | | |
|---|---|---|---|
| 3,442,535 | 5/1969 | Frohlich | 285/27 |
| 3,473,830 | 10/1969 | Haley | 285/364 X |
| 3,489,434 | 1/1970 | Haley | 285/27 X |

FOREIGN PATENTS OR APPLICATIONS 854,763   11/1960   Great Britain .................. 285/DIG. 21

Primary Examiner—Dave W. Arola
Attorney—F. W. Anderson, C. E. Tripp and W. W. Ritt, Jr.

[57] ABSTRACT

A power-actuated pipe coupler for quickly, securely, and releasably coupling together two flanged conduits, such as a marine loading arm and an oil tanker's manifold, in fluid-tight coaxial relationship. The coupler includes a plurality of clamp assemblies mounted on and spaced circumferentially around the end flange of the arm, and power supplied by a hydraulic, pneumatic or electric motor is transmitted through a belt, chain or gear drive unit, a screw shaft, and a toggle link assembly to open and close hook-shaped clamp arms about the manifold flange.

14 Claims, 6 Drawing Figures

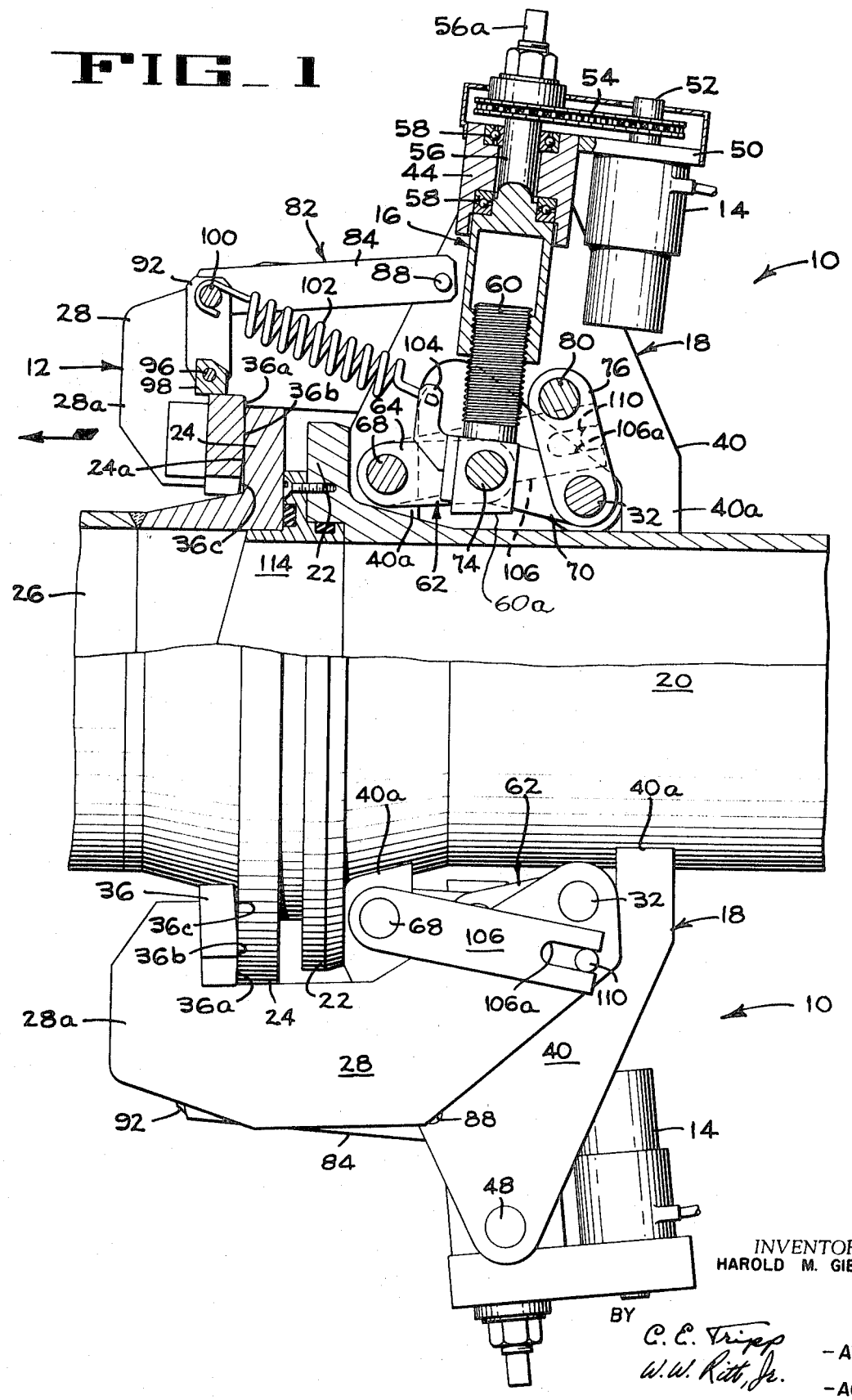

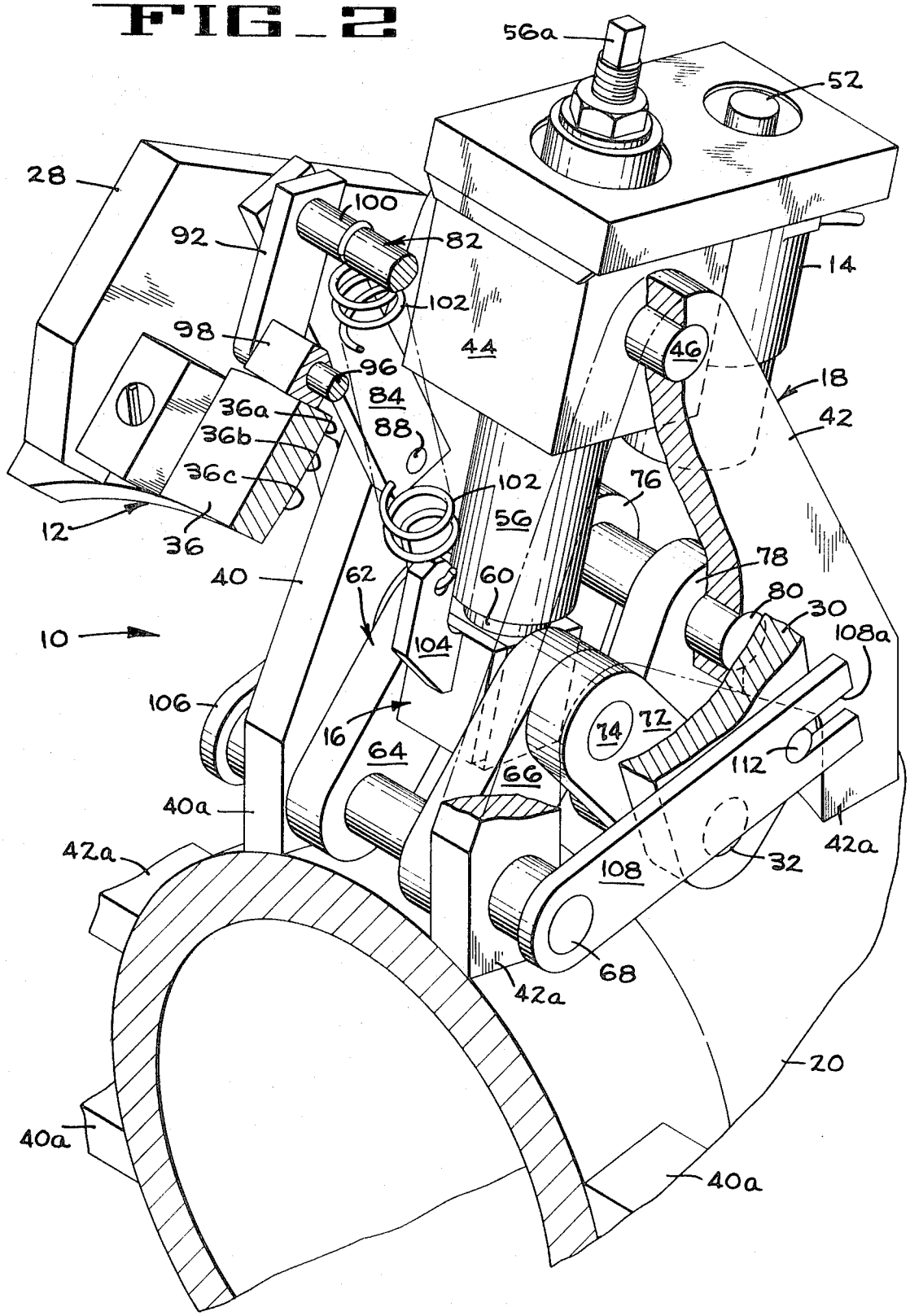
FIG_2

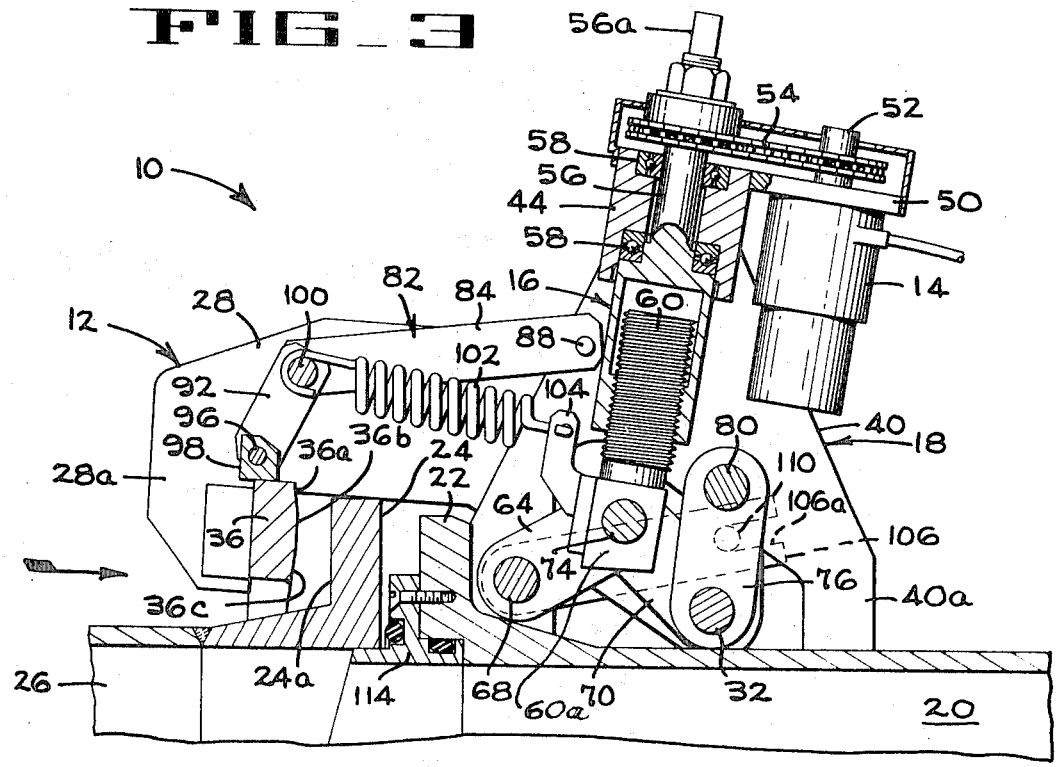
FIG_3
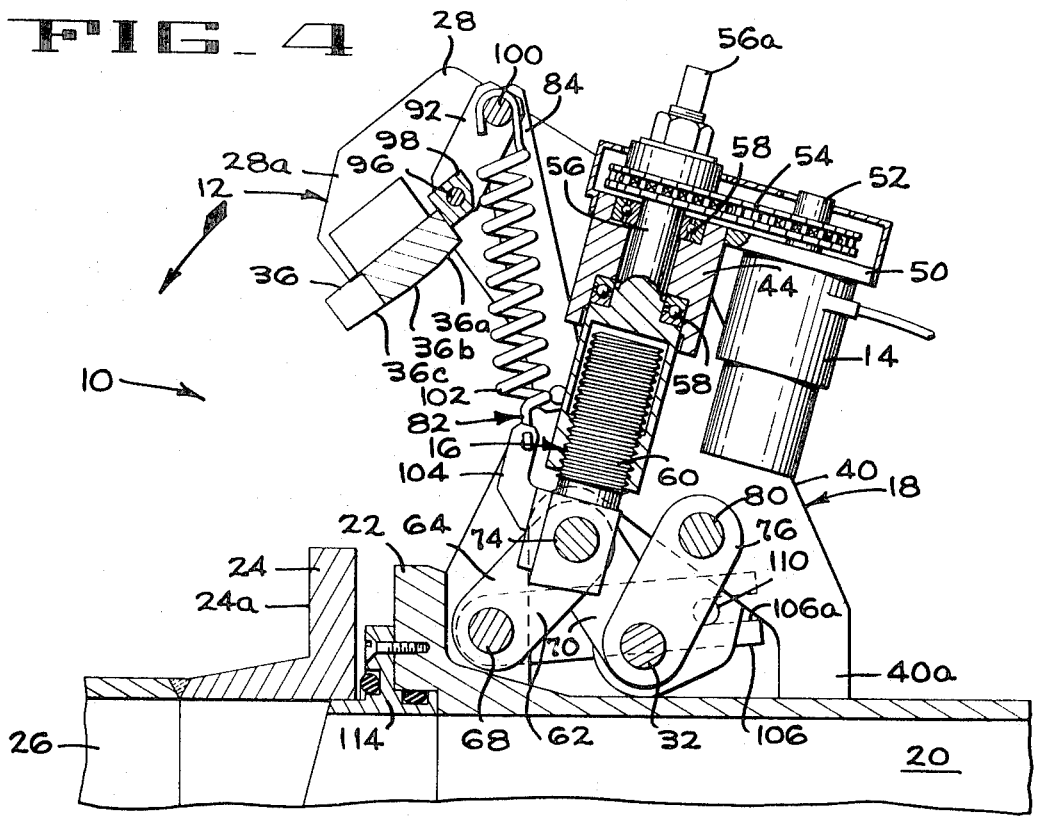
FIG_4

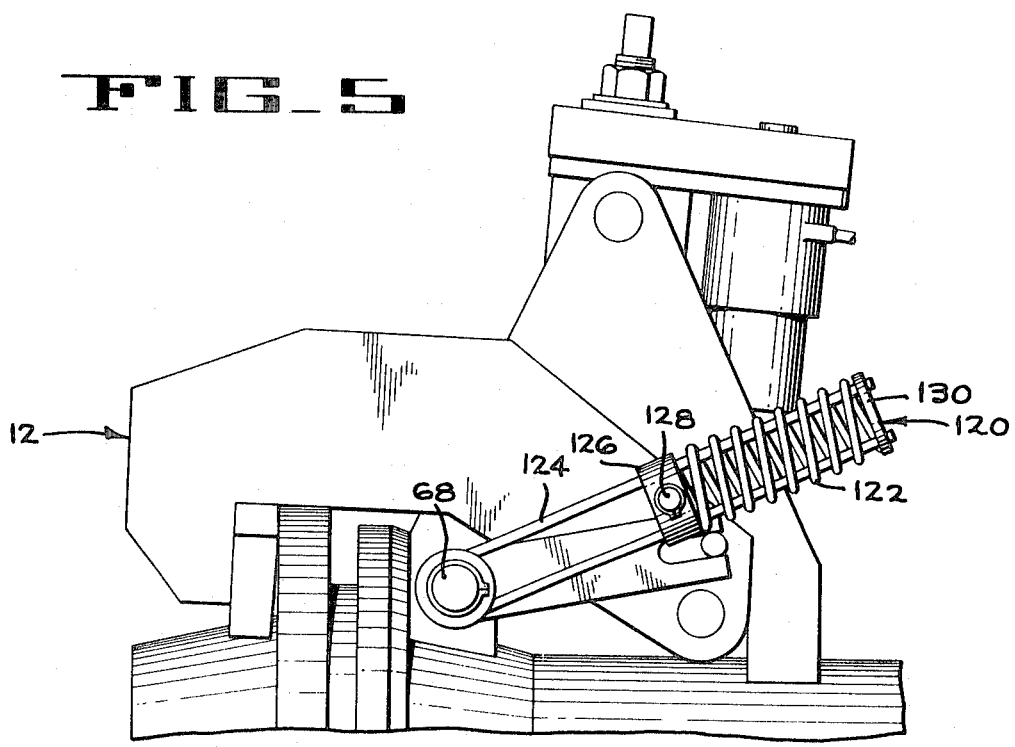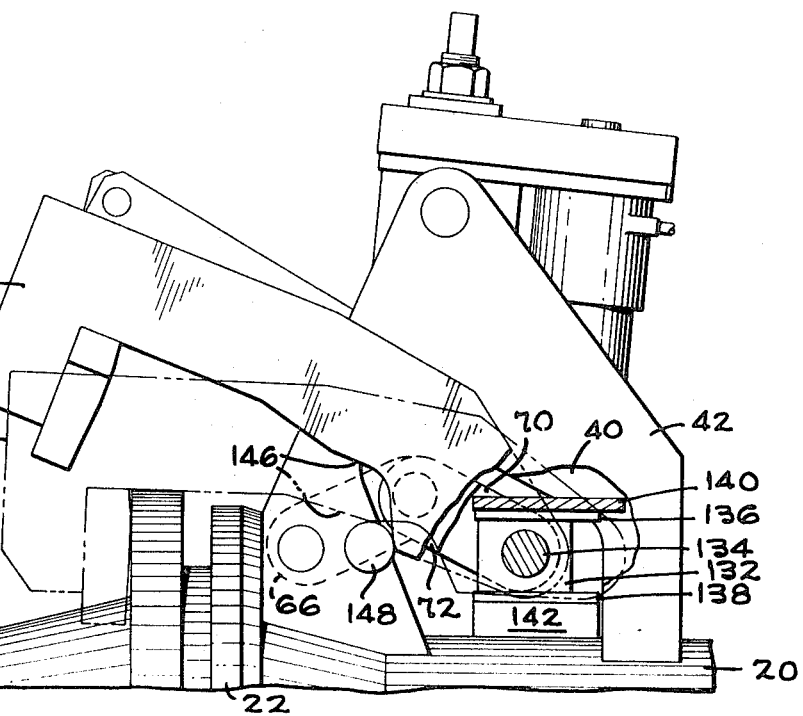

POWER-ACTUATED PIPE COUPLER

BACKGROUND OF THE INVENTION

The present invention pertains to power-actuated couplers for connecting together two flanged pipes, or other such tubular conduits, in coaxial relationship. More particularly, this invention relates to quick connect and release-type pipe couplers with hook-shaped clamps for gripping and holding the end flanges of two pipes in fluid-tight contact, and with toggle link-type assemblies for transmitting hydraulic or electric power to the clamps for opening and closing them. In specific form, the invention involves such a coupler mounted on the outer end of a marine loading arm for coupling the arm to the manifold flange of a marine tanker.

The employment of marine loading arms for transfer of petroleum and other fluid between a land or otherwise relatively stationary terminal and a floating marine vessel has found world-wide acceptance, and arms of 24 inch diameter and with an effective reach of 100 feet are in construction. These huge devices, which may stand 60 feet or more and weigh over 100,000 lbs., are the fastest means so far devised for loading and unloading the million-or-more barrel cargo of modern day super-tankers, and coupling these arms to the tanker's manifold in a quick yet secure and safe manner is a critical phase of this operation.

Various pipe couplers, such as disclosed in Haley U.S. Pats. Nos. 3,473,830 and 3,489,434, have been designed especially for this purpose, and generally speaking their performance has been satisfactory. However, some of the known couplers do not have the facility to provide a positive lock when in the closed position, and such a lock is essential in the event of power failure. Some of these couplers also cannot satisfactorily accommodate a range of flange thicknesses and diameters, or poorly made flanges that vary in dimension from one side to the other, unless manual adjustments of these couplers are first made. In some instances, couplers of the allegedly "quick" variety are in fact inordinately slow and difficult to open by hand, as is sometimes necessary when power failure occurs. Further, the clamping force exerted by several of the known couplers cannot be varied, a limitation that in some situations is very undesirable.

Accordingly, one object of the present invention is to provide a pipe coupler without any of the foregoing problems.

Another object of this invention is to provide a pipe coupler with a novel toggle link-type mechanism for operating the coupler's flange-gripping clamp arms.

Yet another object of this invention is to provide an improved power transmission system for a pipe coupler, the system functioning interchangeably with a hydraulic, pneumatic, electric, or manual power source.

Another object of the present invention is to provide a pipe coupler that functions to draw two pipe flanges together, in addition to its normal function of holding and sealing the flanges in fluid-tight relationship.

Still further objects of the present invention are to provide a toggle link-type, quick-acting pipe coupler that requires no power to resist external loading applied to its clamp arms, that will close to a predetermined position regardless of irregularities in the flanges, that requires a minimum of power to place it in the closed and locked position, and that has favorable weight and manufacturing cost factors.

SUMMARY

Broadly considered, the present invention involves a pipe coupler comprising a plurality of toggle link-type clamp assemblies separately mounted at spaced positions around the circumference of the end portion of a pipe or other conduit and facing forward from its terminal flange, each of the assemblies including a generally hook-shaped clamp arm that is operated by its own individual hydraulic, pneumatic or electric motor through a unique type of transmission through a two-step opening and closing procedure. The transmission combines the features and advantages of a belt, chain or gear drive unit, a helical threaded shaft, and a toggle linkage to facilitate quick operation of the clamp and secure, positive locking thereof in fully closed position, even in the event of power failure. The transmission also facilitates manual operation of the clamp should such power failure occur, or should it otherwise be desired to open or close the clamp by hand. The two-step opening and closing procedures enable the clamp to close and lock satisfactorily against flanges of widely varying thickness and diameters, including a flange that itself is of non-uniform dimensions, and to draw both flanges of the two conduits together from a spaced position preparatory to closing and locking on them. Furthermore, the clamp assemblies will close and lock with a minimum of power, and will maintain their closed and locked position without any increase in that power, regardless of the increase in opposing force tending to separate the flanges.

BRIEF DESCRIPTION OF THE DRAWINGS

FIG. 1 is a fragmentary side elevation of the end portion of a marine loading arm coupled in coaxial relationship to a petroleum tanker's manifold flange by a coupler according to this invention, the coupler comprising a pair of clamp assemblies mounted at diametrically opposite locations on the loading arm, with the uppermost assembly shown in partial central section and the lowermost assembly shown in full.

FIG. 2 is an isometric view, partially broken away, of a FIG. 1 clamp assembly in its fully opened position.

FIG. 3 is a view in central vertical section of the uppermost clamp assembly of FIG. 1 as it appears when partially opened.

FIG. 4 is a view like FIG. 3, but showing the clamp assembly as it appears when fully opened.

FIG. 5 is a view in elevation of a modified form of the clamp assembly of FIGS. 1–4, in fully closed position.

FIG. 6 is a view in elevation, partially broken away, of another modified form of the FIG. 1–4 clamp assembly in fully opened position, and illustrating in phantom lines its position when fully closed.

DESCRIPTION OF THE PREFERRED EMBODIMENTS

One preferred embodiment of the coupler of this invention is illustrated in FIGS. 1 through 4 of the drawings. This particular coupler has two clamp assemblies 10 mounted in diametrically opposite locations on the end of marine loading arm 20, thereby facilitating an evenly distributed grip around the end flange 24 of the tanker's manifold 26, and assuring a fluid-tight seal between the flange 24 and the loading arm's terminal flange 22. Usually one coupler has three or four clamp assemblies, as is diagrammatically represented by portions of additional assemblies in FIG. 2, and of course this invention facilitates such an arrangement, as well as any number of such assemblies. All the clamp assemblies of this embodiment are identical, so that the following description is equally applicable to each one.

Each clamp assembly 10 comprises a clamp 12 of generally hook-shaped configuration when viewed in side elevation, a motor 14 for providing the necessary power to operate the clamp, a transmission 16 for transmitting the power from the motor 14 to the clamp 12, and a bracket 18 on which the clamp 12, the motor 14 and the transmission 16 are mounted. The clamp assembly 10 is mounted on the outer terminal portion 20 of the loading arm, with the clamps 12 projecting of facing forward from the arm's end flange 22.

The clamp 12 comprises a pair of generally hook-shaped arms 28, 30, and a bearing pad 36 that is fixed to and thus interconnects the arms' hook-shaped ends, only that end 28a of the arm 28 being shown. This bearing pad 36 is arcuately shaped, as seen in FIG. 2, to coincide generally with the curvature of the manifold flange against which it bears when the clamp is fully closed. The flange-contacting face of the bearing pad 36 preferably is contoured in a radial direction to provide a plurality of arcuate, flange-abutting surfaces 36a, 36b, 36c (FIG. 3) to permit the pad to bear in flush contact with the back side of manifold flanges of various diameters when the clamp is fully closed (FIG. 1).

The bracket 18 comprises a pair of plates 40, 42 shaped generally like an inverted V, each plate having a pair of feet 40a, 42a welded or otherwise fixed to the loading arm 20. The plates 40, 42 extend outwardly from the loading arm in spaced parallel relationship to provide a rigid, secure support for the clamp 12, the motor 14 and the transmission 16, as will be further explained later.

The transmission 16 includes a belt, chain or gear drive unit 54, a screw shaft 56, a non-rotatable shaft 60, and a toggle-type linkage system 62. The screw shaft 56 is journaled by bearings 58 in a bearing block 44 that is pivotally supported by pins 46, 48 extending from the apexes of the bracket plates 40, 42. The motor 14 is mounted on a bracket 50 that is fixed to the bearing block 44, and the motor's shaft 52 is connected by the drive unit 54 (FIG. 1) to the screw shaft 56 so that operation of the motor 14 causes the screw shaft 56 to rotate in the bearing block 44. The outer end 56a of the screw shaft 56 preferably is of square or hexagonal shape in cross section, so that it also can be rotated by a wrench in order to open or close the clamp 12 in the event of power failure. The motor 14, the drive unit 54, and the screw shaft 56 pivot together with the bearing block 44 about the common axis through the pivot pins 46, 48.

The lower end of the screw shaft 56 threadedly engages the non-rotatable shaft 60, so that as the screw shaft 56 is rotated the non-rotatable shaft 60 moves either inwardly towards the loading arm 20, or outwardly away therefrom, depending upon the hand of the threads and the direction of rotation of the shaft 56. The inner end surface 60a of the screw shaft 60 provides a stop that, in cooperation with the surface of the loading arm 20, prevents inward movement of the center of the shaft 74 beyond a line through the centers of the shafts 32 and 68, i.e., prevents "over-center" positioning of the toggle linkage system 62.

The toggle-type linkage system 62 connects the non-rotatable shaft 60, and hence the drive unit 54, to the clamp 12. This toggle linkage system comprises a pair of front links 64, 66 pivotally mounted on a shaft 68 that extends through the forward feet of the bracket plates 40, 42, and a pair of rear links 70, 72 pivotally connected to the links 64, 66 by a shaft 74, and to the clamp 12 by the shaft 32. The shaft 74 also extends through a transverse bore in the inner end of the non-rotatable shaft 60, thereby connecting this toggle linkage system to the drive unit 54. A pair of support links 76, 78 pivotably interconnect the shaft 32 and a shaft 80 that is mounted in the bracket plates 40, 42, to complete a three-point support system on the bracket plates, i.e., as defined by the axes through the shaft 68, the shaft 80, and the pins 46, 48, for the clamp 12, the motor 14, and the transmission 16.

The clamp 12 is biased at all times towards its closed position by a spring assembly 82. This spring assembly includes a pair of long links 84 (only one shown) pivotally mounted on pins 88 (only one shown) that are journaled in, and project laterally from, the bracket plates 40, 42, and a pair of short links 92 (only one shown) pivotally connected to a shaft 96 that extends through a block 98 fixed to the bearing pad 36. The long links 84 are pivotally connected to the short links 92 by a shaft 100 that also provides a means for connecting one end of a helical spring 102, the other end of the spring being attached to a bracket 104 that is fixed to the inner end of the non-rotatable shaft 60. The length of the spring 102 is dimensioned to maintain tension between the shaft 100 and the bracket 104 during all positions in which the clamp 12 may attain, so that the clamp is always biased toward its fully closed position against the manifold flange 24. If desired, other types of springs can be used in lieu of the spring 102, such as one based against side plates 40, 42 and applying a closing bias to the long links 84.

A pair of generally rearwardly extending arms 106, 108 are pivotally mounted at their forward ends on the shaft 68, and are bifurcated into a yoke-like configuration at their rearward ends to provide guide slots 106a, 108a in which ride laterally projecting guide pins 110, 112 that are fixed to the adjacent clamp arms 28, 30, respectively. The primary function of these arms 106, 108 and pins 110, 112 is to cause the clamp 12 to open in a step-wise manner as it pivots about the shaft 32, i.e., so that the clamp moves forwardly in a generally straight-line-direction (as indicated by the arrow in FIG. 1) from the manifold flange 24 until the pins bottom in the guide slots, and then moves outwardly in a generally curved-path-direction (opposite to that of the arrow in FIG. 4) away from the manifold 26. Another function is to prevent pivotal movement of the clamp 12 on the shaft 32 towards the closed position, i.e., in the direction of the arrow in FIG. 4, unless the shaft 32 simultaneously moves rearwardly, i.e., from left to right as viewed in FIG. 4, in an arc centered on shaft 80.

Since neither the shaft 32 nor the shaft 74 can move without simultaneous movement of the non-rotatable shaft 60, and the shaft 70 can be moved only by rotating the screw shaft 56, the clamp 12 will open or close only if the screw shaft 56 is rotated. Because of the threaded relationship between the shafts 60 and 56, the shaft 56 cannot be rotated solely by the application of a force longitudinally against the shaft 60, such as would occur is pressure in a clamp-opening direction where applied against the face of the clamp's bearing pad 36. Therefore, when the clamp 12 is closed (FIG. 1) all forces tending to separate the flanges 22, 24, will fail in the absence of rotation of the screw shaft 56. Accordingly, the clamp is effectively locked in the closed position, subject to unlocking and opening only upon deliberate rotation of the screw shaft 56.

OPERATION

FIGS. 1, 3 and 4 illustrate, successively, the fully closed, partially opened, and fully opened positions of the clamp 12. Starting from the fully opened position as shown in FIG. 4, when the motor 14 is operated to rotate the screw shaft 56 so that the non-rotatable shaft 60 and the pivot shaft 74 move inwardly towards the loading arm 20, the links 64, 66 cooperate with the links 70, 72 to exert a toggle effect on the shafts 68 and 32. Since the shaft 68 extends through a bracket plates 40, 42, it cannot move in response to this toggle effect, and therefore inward movement of the shafts 60, 74 causes the shaft 32 to move rearwardly away from the loading arm's flange 22.

As the shaft 32 moves rearwardly, the clamp 12 moves with it and simultaneously pivots about that shaft, and to a minor extent also about the common axis through pins 110, 112, in the direction of the arrow in FIG. 4, within the limitation imposed on it by the guide arms 106, 108. This pivotal movement of the clamp 12 in the direction of the arrow, i.e., towards the manifold 26, will continue until the clamp contacts either the outer periphery of the manifold's flange 24, the guide element 114 when it has a greater outside diameter than the flange 24, or the manifold itself, at which time further pivotal movement of the clamp will cease. Continued movement of the non-rotatable shaft 60 towards the loading arm 20 causes the clamp 12 then to move rearwardly with respect to the loading arm flange 22, i.e., in the direction of the arrow in FIG. 3, until one of the surfaces 36a, 36b, 36c comes to bear against the back surface 24a of the flange 24 and draws this flange into fluid-tight contact with the forward face and seal of the guide element 114 that is fastened to and extends from the flange 22.

Opening the clamp from the fully closed position (FIG. 1) is accomplished by the reverse of the foregoing procedure, that is by rotating the screw shaft 56 in the opposite direction. This first draws the non-rotatable shaft 60 outwardly away from the loading arm 20, thus causing the pivot shaft 74 also to move outwardly and the toggle links 64, 66, 70, 72 to draw the shaft 32 forward towards the flange 22. The clamp arms 28, 30 also move forwardly with the shaft 32 away from the rear face of the flange 24 until the pins 110, 112 bottom in the guide slots 106a, 108a, thereby preventing further forward movement of the clamp arms. As the non-rotatable shaft 60 continues to move outwardly from the loading arm 20 and the clamp 12 then pivots about the shaft 32, and to a minor extent also about the common axis through the pins 110, 112, outwardly into its fully opened position illustrated in FIG. 4.

Accordingly, it should now be understood that operation of the clamp 12 from the fully opened (FIG. 4) to the fully closed (FIG. 1) position involves two steps, the first step being a generally curved-path-movement inwardly in the direction of the arrow in FIG. 4 towards the manifold 26, and the second step being a generally straight-line-movement rearward in the direction of the arrow in FIG. 3 until the manifold flange 24 and the loading arm flange 22 are in fluid tight communication. It also should now be clear that operation of the clamp 12 from the fully closed to the fully opened position also involves two steps, the first being a generally straight-line-movement forward in the direction of the arrow in FIG. 1 until the pins 110, 112 bottom in their guide slots 106a, 18a respectively, and the second being a generally curved-path-movement outwardly in a direction opposite to that of the arrow in FIG. 4 away from the manifold 26.

These two-step movements of the clamp 12 as it opens or closes facilitate satisfactorily coupling any loading arm, on which clamp assemblies according to this invention are installed, to all manifold flanges whether of uniform or varying thickness and outside diameter, thereby solving a serious problem that often is encountered when servicing or coupling to the tankers currently in operation throughout the world today. As a result, no time-consuming, and thus costly, changes need be performed on a coupler embodying the clamp assemblies of this invention before it can be employed to connect the loading arm to a manifold of different size or configuration from that previously serviced.

MODIFICATIONS

FIG. 5 illustrates one modified form of the foregoing described preferred embodiment of this invention. In this modification, a pair of identical spring assemblies 120 are used instead of the spring assembly 82 for biasing the clamp 12 towards its closed position. The spring assemblies 120 are mounted on opposite sides of the clamp assembly, and therefore only one spring assembly is shown in FIG. 5. The assembly 120 comprises a helical spring 122 surrounding, and carried by, a generally U-shaped spring rod 124 that extends around and from the shaft 68, a guide pad 126 through which the spring slidably extends and which is pivotally mounted on a pin 128 extending laterally from the adjacent clamp arm, and a plate 130 that functions as a keeper between the spring and spring rod. The spring 122 is compressed between the pad 126 and the plate 130, so that pressure is always present against the pad 126 urging it toward the shaft 68, and hence urging the clamp 12 into its fully closed position. In all other respects, the clamp assembly of FIG. 5 is identical to that illustrated in FIGS. 1 through 4.

Another modified form of the clamp assembly of FIGS. 1 through 4 is illustrated in FIG. 6. In this modification, the support links 76, 78 and their pivot shaft 80 are eliminated. The two rear links 70, 72 are connected instead to a slide block 132 through a pivot shaft 134. The slide block 132 is slidably movable in a forward and rearward direction between two bearing plates 136, 138, which in turn are supported on the bracket plates 40, 42 and the loading arm 20, respectively, by laterally extending braces 140, 142. Therefore, as the non-rotatable shaft 70 is moved towards the loading arm 20, the toggle action of the links 64, 66, 70, 72 forces the slide block 132 rearwardly, i.e., away from the flange 22, guided by the bearing plates 136, 138.

Each of the clamp arms 144 has a contoured cam surface 146 that rides against a cam follower 148 that is rotatably mounted on the bracket plate adjacent thereto. The configuration of the cam surface 146 causes the clamp 12 to open and close in a step-wise manner identical with that of the clamp assemblies of FIGS. 1 through 5. In all other respects, the elements of this modification are functionally identical with those of the clamp assemblies of FIGS. 1-4.

Although the best mode contemplated for carrying out the present invention has been herein shown and described, it will be apparent that modification and variation may be made without departing from what is regarded to be the subject matter of the invention.

What is claimed is:

1. A power-actuated clamp assembly for coupling two flanged conduits together in coaxial fluid-tight relationship, comprising a generally hook-shaped clamp pivotally supported on a bracket on one of the flanged conduits for stepwise movement between an opened position and a closed position in which the flanged conduits are clamped together; a power transmission supported on said bracket for transmitting power to the clamp to move it between said opened and closed positions, said transmission comprising a toggle-type link mechanism having one end fixed and the other end movable with respect to said bracket, said clamp being pivotally connected to said other end, and a rotatable helically-threaded connecting unit interconnecting said bracket and said link mechanism; and means for applying rotary power to said transmission for moving at least said other end of said link mechanism, thereby moving the clamp between said opened and closed positions, said clamp being movable from its closed position only by relative rotation between threadedly interconnected elements in said connecting unit.

2. A clamp assembly according to claim 1 wherein said connecting unit comprises means for accepting rotary power from said rotary power applying means, and means for conducting the resultant force of said power to said link mechanism.

3. A clamp assembly according to claim 2 wherein said power-accepting means comprises a rotatable screw shaft and said force-conducting means comprises a non-rotatable shaft, said shafts being threadedly interconnected so that upon rotation of said screw shaft said non-rotatable shaft is extended from or retracted into said screw shaft.

4. A clamp assembly according to claim 3 wherein said non-rotatable shaft is connected to said toggle-type link mechanism, and said link mechanism is pivotally interconnected with said clamp and said bracket.

5. A clamp assembly according to claim 1 including means for resiliently biasing said clamp towards its closed position.

6. A clamp assembly according to claim 5 wherein said biasing means comprises spring means extending between said clamp and said transmission.

7. A clamp assembly according to claim 1 wherein said power transmission includes a rotatable screw shaft pivotably supported on said bracket, a rotary drive unit connected to said screw shaft, and a non-rotatable shaft interconnecting said screw shaft and said toggle-type link mechanism, whereby operation of said rotary drive unit in one direction causes said clamp to close, and operation of said rotary drive unit in the opposite direction causes said clamp to open.

8. A clamp assembly according to claim 7 wherein said clamp, in closing from a fully opened position, moves first in a generally curved path, and then moves in a generally straight-line path, and in opening from a fully closed position moves first in a generally straight-line path and then in a generally curved path.

9. A clamp assembly according to claim 8 wherein said clamp cannot be opened from a fully closed position without rotation of said screw shaft.

10. A clamp assembly according to claim 9 wherein said screw shaft is rotatable manually and mechanically, whereby said clamp can be opened and closed by hand in the event of power failure.

11. A power-actuated pipe coupler for connecting together two flanged pipes in fluid-tight contact, said coupler comprising a plurality of clamp assemblies spaced about and fixed to the outer surface of one pipe with the clamps facing forward from the pipe's flange, each of said assemblies comprising a generally hook-shaped clamp pivotally supported on a bracket on one of the flanged pipes for step-wise movement between an opened position and a closed position in which the flanged pipes are clamped together; a power transmission supported on said bracket for transmitting power to the clamp to move it between said opened and closed positions, said transmission comprising a toggle-type link mechanism having one end fixed and the other end movable with respect to said bracket, said clamp being pivotally connected to said other end, and a rotatable helically threaded connecting unit interconnecting said bracket and said link mechanism; and means for applying rotary power to said transmission for moving at least said other end of said link mechanism, thereby moving the clamp between said opened and closed positions, said clamp being movable from its closed position only by relative rotation between threadedly interconnected elements in said connecting unit, said coupler thereby holding said two pipes locked together when said clamps of said assemblies are closed so long as rotary power is not applied to said connecting unit.

12. A pipe coupler according to claim 11 wherein each of said connecting units includes a rotatable screw shaft threadedly interconnected with a non-rotatable shaft that is connected to said toggle-type link mechanism.

13. A pipe coupler according to claim 12 wherein the clamp of each assembly closes in a two-step manner from a fully opened position, the first step comprising a generally curved-path-movement into contact with a surface of the pipe to which the coupler is positioned to couple, and the second step comprising a generally-straight-path movement rearwardly towards the flange of the pipe upon which the coupler is mounted.

14. A pipe coupler according to claim 13 wherein each of said clamp assemblies is capable of closing and locking against a different flange thickness or diameter whereby said coupler can couple to a pipe flange of non-uniform thickness and to a plurality of pipe flanges of varying diameters without preliminary manual adjustment.

* * * * *

PO-1050
(5/69)

UNITED STATES PATENT OFFICE
CERTIFICATE OF CORRECTION

Patent No. 3,661,408            Dated May 9, 1972

Inventor(s) H ROLD M. GIBBONS

It is certified that error appears in the above-identified patent and that said Letters Patent are hereby corrected as shown below:

Col. 4, line 41, change "a" to --the--
Col. 5, line 17, change "18a" to --108a--
Col. 5, line 66, change "70" to --60--
Col. 6, line 69, (Claim 10) insert a period after "failure"

Signed and sealed this 29th day of August 1972.

(SEAL)
Attest:

EDWARD M. FLETCHER, JR.           ROBERT GOTTSCHALK
Attesting Officer                   Commissioner of Patents